United States Patent
Shahoian et al.

(10) Patent No.: US 8,125,453 B2
(45) Date of Patent: Feb. 28, 2012

(54) SYSTEM AND METHOD FOR PROVIDING ROTATIONAL HAPTIC FEEDBACK

(75) Inventors: Erik J. Shahoian, San Ramon, CA (US); Alexander Jasso, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 599 days.

(21) Appl. No.: 10/689,130

(22) Filed: Oct. 20, 2003

(65) Prior Publication Data

US 2004/0178989 A1 Sep. 16, 2004

Related U.S. Application Data

(60) Provisional application No. 60/419,984, filed on Oct. 20, 2002.

(51) Int. Cl.
*G06F 3/041* (2006.01)
(52) U.S. Cl. ...................... 345/173; 178/18.01
(58) Field of Classification Search .................. 345/156, 345/157, 173–178
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Frosch et al. |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Forest |
| 4,484,191 A | 11/1984 | Vavra |
| 4,513,235 A | 4/1985 | Acklam et al. |
| 4,581,491 A | 4/1986 | Boothroyd |

(Continued)

FOREIGN PATENT DOCUMENTS

EP 0349086 1/1990

(Continued)

OTHER PUBLICATIONS

Adelstein, "A Virtual Environment System for the Study of Human Arm Tremor," Ph.D. Dissertation, Dept. of Mechanical Engineering, MIT, Jun. 1989.

(Continued)

*Primary Examiner* — Bipin Shalwala
*Assistant Examiner* — Steven Holton
(74) *Attorney, Agent, or Firm* — Kilpatrick Townsend & Stockton LLP

(57) ABSTRACT

Systems and methods for providing haptic cues to a touch-sensitive input device having a rotary degree of freedom are described. One system described comprises a touch sensitive input device is configured to move in a rotary degree of freedom. The system further comprises an actuator configured to produce a rotational force on the touch-sensitive input device. In one such system, the actuator comprises an electromagnetic core configured to produce force on a magnet affixed to the touch-sensitive input device. In another such system, a motor provides the rotational force.

16 Claims, 13 Drawing Sheets

U.S. PATENT DOCUMENTS

| | | | |
|---|---|---|---|
| 4,599,070 | A | 7/1986 | Hladky et al. |
| 4,708,656 | A | 11/1987 | De Vries et al. |
| 4,713,007 | A | 12/1987 | Alban |
| 4,758,165 | A | 7/1988 | Tieman et al. |
| 4,772,205 | A | 9/1988 | Chlumsky et al. |
| 4,794,392 | A | 12/1988 | Selinko |
| 4,885,565 | A | 12/1989 | Embach |
| 4,891,764 | A | 1/1990 | McIntosh |
| 4,926,879 | A | 5/1990 | Sevrain et al. |
| 4,930,770 | A | 6/1990 | Baker |
| 4,934,694 | A | 6/1990 | McIntosh |
| 5,019,761 | A | 5/1991 | Kraft |
| 5,022,384 | A | 6/1991 | Freels |
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,121,091 | A | 6/1992 | Fujiyama |
| 5,165,897 | A | 11/1992 | Johnson |
| 5,175,459 | A | 12/1992 | Danial et al. |
| 5,185,561 | A * | 2/1993 | Good et al. .................. 318/432 |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,283,970 | A | 2/1994 | Aigner |
| 5,299,810 | A | 4/1994 | Pierce |
| 5,302,132 | A | 4/1994 | Corder |
| 5,309,140 | A | 5/1994 | Everett, Jr. et al. |
| 5,334,027 | A | 8/1994 | Wherlock |
| 5,389,849 | A | 2/1995 | Asano et al. |
| 5,436,622 | A | 7/1995 | Gutman et al. |
| 5,437,607 | A | 8/1995 | Taylor |
| 5,461,711 | A | 10/1995 | Wang et al. |
| 5,466,213 | A | 11/1995 | Hogan |
| 5,547,382 | A | 8/1996 | Yamasaki |
| 5,575,761 | A | 11/1996 | Hajianpour |
| 5,600,777 | A | 2/1997 | Wang et al. |
| 5,638,060 | A | 6/1997 | Kataoka et al. |
| 5,719,561 | A | 2/1998 | Gonzales |
| 5,736,978 | A | 4/1998 | Hasser et al. |
| 5,766,016 | A | 6/1998 | Slnclair |
| 5,785,630 | A | 7/1998 | Bobick et al. |
| 5,887,995 | A | 3/1999 | Holehan |
| 5,917,906 | A | 6/1999 | Thronton |
| 5,936,613 | A | 8/1999 | Jaeger et al. |
| 5,977,867 | A | 11/1999 | Blouin |
| 6,008,800 | A | 12/1999 | Pryor |
| 6,067,081 | A | 5/2000 | Hahlganss et al. |
| 6,081,536 | A | 6/2000 | Gorsuch et al. |
| 6,111,577 | A | 8/2000 | Zilles et al. |
| 6,118,435 | A | 9/2000 | Fujita et al. |
| 6,128,006 | A * | 10/2000 | Rosenberg et al. ............ 345/163 |
| 6,140,987 | A | 10/2000 | Stein et al. |
| 6,151,332 | A | 11/2000 | Gorsuch et al. |
| 6,160,489 | A | 12/2000 | Perry et al. |
| 6,198,206 | B1 | 3/2001 | Saarmaa et al. |
| 6,211,861 | B1 * | 4/2001 | Rosenberg et al. ............ 345/163 |
| 6,215,778 | B1 | 4/2001 | Lomp et al. |
| 6,218,966 | B1 | 4/2001 | Goodwin et al. |
| 6,219,034 | B1 | 4/2001 | Elbing et al. |
| 6,225,980 | B1 * | 5/2001 | Weiss et al. .................. 345/161 |
| 6,236,647 | B1 | 5/2001 | Amalfitano |
| 6,243,080 | B1 | 6/2001 | Molne |
| 6,262,717 | B1 | 7/2001 | Donohue et al. |
| 6,283,859 | B1 * | 9/2001 | Carlson et al. ................. 463/36 |
| 6,307,465 | B1 | 10/2001 | Kayama et al. |
| 6,326,901 | B1 | 12/2001 | Gonzales |
| 6,337,678 | B1 | 1/2002 | Fish |
| 6,373,463 | B1 | 4/2002 | Beeks |
| 6,388,655 | B1 | 5/2002 | Leung |
| 6,388,999 | B1 | 5/2002 | Gorsuch et al. |
| 6,414,674 | B1 | 7/2002 | Kamper et al. |
| 6,422,941 | B1 | 7/2002 | Thorner et al. |
| 6,429,846 | B2 | 8/2002 | Rosenberg et al. |
| 6,445,284 | B1 | 9/2002 | Cruz-Hernandez et al. |
| 6,469,695 | B1 | 10/2002 | White |
| 6,487,421 | B2 | 11/2002 | Hess et al. |
| 6,509,892 | B1 | 1/2003 | Kamper et al. |
| 6,518,958 | B1 | 2/2003 | Miyajima et al. |
| 6,535,201 | B1 | 3/2003 | Cooper et al. |
| 6,628,195 | B1 | 9/2003 | Coudon |
| 6,636,202 | B2 | 10/2003 | Ishmael, Jr. et al. |
| 6,639,582 | B1 | 10/2003 | Shrader |
| 6,647,145 | B1 | 11/2003 | Gay |
| 7,046,230 | B2 * | 5/2006 | Zadesky et al. ............... 345/156 |
| 2001/0035854 | A1 | 11/2001 | Rosenberg et al. |
| 2002/0033795 | A1 | 3/2002 | Shahoian et al. |
| 2002/0149561 | A1 | 10/2002 | Fukumoto et al. |
| 2002/0149570 | A1 | 10/2002 | Knowles et al. |
| 2002/0156807 | A1 | 10/2002 | Dieberger |
| 2003/0006892 | A1 | 1/2003 | Church |
| 2003/0016211 | A1 | 1/2003 | Woolley |
| 2003/0022701 | A1 | 1/2003 | Gupta |
| 2003/0025679 | A1 | 2/2003 | Taylor et al. |
| 2003/0030628 | A1 | 2/2003 | Sato et al. |
| 2003/0038776 | A1 | 2/2003 | Rosenberg et al. |
| 2003/0048260 | A1 | 3/2003 | Matusis |
| 2003/0058265 | A1 | 3/2003 | Robinson et al. |
| 2003/0067449 | A1 | 4/2003 | Yoshikawa et al. |
| 2003/0071795 | A1 | 4/2003 | Baldauf et al. |
| 2003/0095105 | A1 | 5/2003 | Vaananen |
| 2003/0128191 | A1 | 7/2003 | Strasser et al. |
| 2003/0128192 | A1 | 7/2003 | van Os |
| 2003/0151597 | A1 | 8/2003 | Roberts et al. |
| 2003/0174121 | A1 | 9/2003 | Poupyrev et al. |
| 2003/0179190 | A1 | 9/2003 | Franzen |
| 2004/0233159 | A1 * | 11/2004 | Badarneh ...................... 345/156 |

FOREIGN PATENT DOCUMENTS

| | | | |
|---|---|---|---|
| EP | 0556999 | B1 | 5/1998 |
| EP | 1182851 | A1 | 2/2002 |
| JP | 01-003664 | | 7/1990 |
| JP | 02-109714 | | 1/1992 |
| JP | 04-007371 | | 8/1993 |
| JP | 05-193862 | | 1/1995 |
| JP | 2001-350592 | A | 12/2001 |
| JP | 2002-259059 | A | 9/2002 |
| WO | 97/18546 | A1 | 5/1997 |
| WO | WO 99/49443 | | 9/1999 |
| WO | 02/12991 | A1 | 2/2002 |
| WO | 02/27645 | | 4/2002 |
| WO | 02/31807 | A1 | 4/2002 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254; Nov. 6-8, 1990.

Bejczy et al., "Kinesthetic Coupling Between Operator and Remote-Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

Bejczy, et al., "Universal Computer Control System (UCCS) for Space Telerobots," CH2413-3/87/0000/0318501.00 1987 IEEE, 1987.

Bejczy et al., "A Laboratory Breadboard System for Dual-Arm Teleoperation," SOAR '89 Workshop, JSC, Houston, TX, Jul. 25-27, 1989.

Bliss, "Optical-to-Tactile Image Conversion for the Blind," IEEE Transactions on Man-Machine Systems, vol. MMS-11, No. 1, Mar. 1970.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Cadler, "Design of a Force-Feedback Touch-Introducing Actuator for Teleoperator Robot Control," Bachelor of Science Thesis, MIT, Jun. 23, 1983.

Caldwell et al., "Enhanced Tactile Feedback (Tele-Taction) Using a Multi-Functional Sensory System," 1050-4729/93, pp. 955-960, 1993.

"Cyberman Technical Specification," Logitech Cyberman SWIFT Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Fokumoto, "Active Click: Tactile Feedback for Touch Panels," ACM CHI2001 Extended Abstracts, pp. 121-122, Apr. 2001.

Force Feedback Touch Panel, Represented by CSC Division, Sales Departmentt., SIXIK Corporation, Tokyo, Japan, www.smk.co.jp.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bullein, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Johnson, "Shape-Memory Alloy Tactile Feedback Actuator," Armstrong Aerospace Medical Research Laboratory, AAMRL-TR-90-039, Aug. 1990.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," Presence, 4(4):387-402, 1995.

Lake; "Cyberman from Logitech," GameBytes, 1994.

Marcus, "Touch Feedback in Surgery," Proceedings of Virtual Reality and Medicine the Cutting Edge, Sep. 8-11, 1994.

McAffee, "Teleoperator Subsystem/Telerobot Demonsdtrator: Force Reflecting Hand Controller Equipment Manual;" JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Ocotober 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Safe Flight Instruments Corporation, "Coaxial Control Shaker," Part No. C-25502, Jul. 1, 1967.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30-Oct. 1, 1992.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

SMK Corporation, "Force Feedback Type Optical Touch Panel Developed," SMK Corporation Website, Oct. 30, 2002.

Snow et al:, "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fouteenth Annual Northeast Bioengineering Conference, University of New Hampshire, Mar. 10-11, 1988.

Wiker, "Teletouch Display Development: Phase 1 Report," Technical Report 1230, Naval Ocean Systems Center, San Diego, Apr. 17, 1989.

iPod (Touchwheel): Jumpy or Erratic Touchwheel Operations web page at ttp://docs.info.apple.com/article.html?artnum=61687, as available via the internet and printed on Jul. 12, 2004.

Patent Cooperation Treaty, International Search Report, International Application No. PCT/US03/33202, mailed on Aug. 23, 2004, 7 pages.

British Patent Office, Examination Report under Section 18(3), Application No. GB0509757, dated May 19, 2006.

British Patent Office, Examination Report under Section 18(3), Application No. GB0509757, dated Dec. 13, 2006.

\* cited by examiner

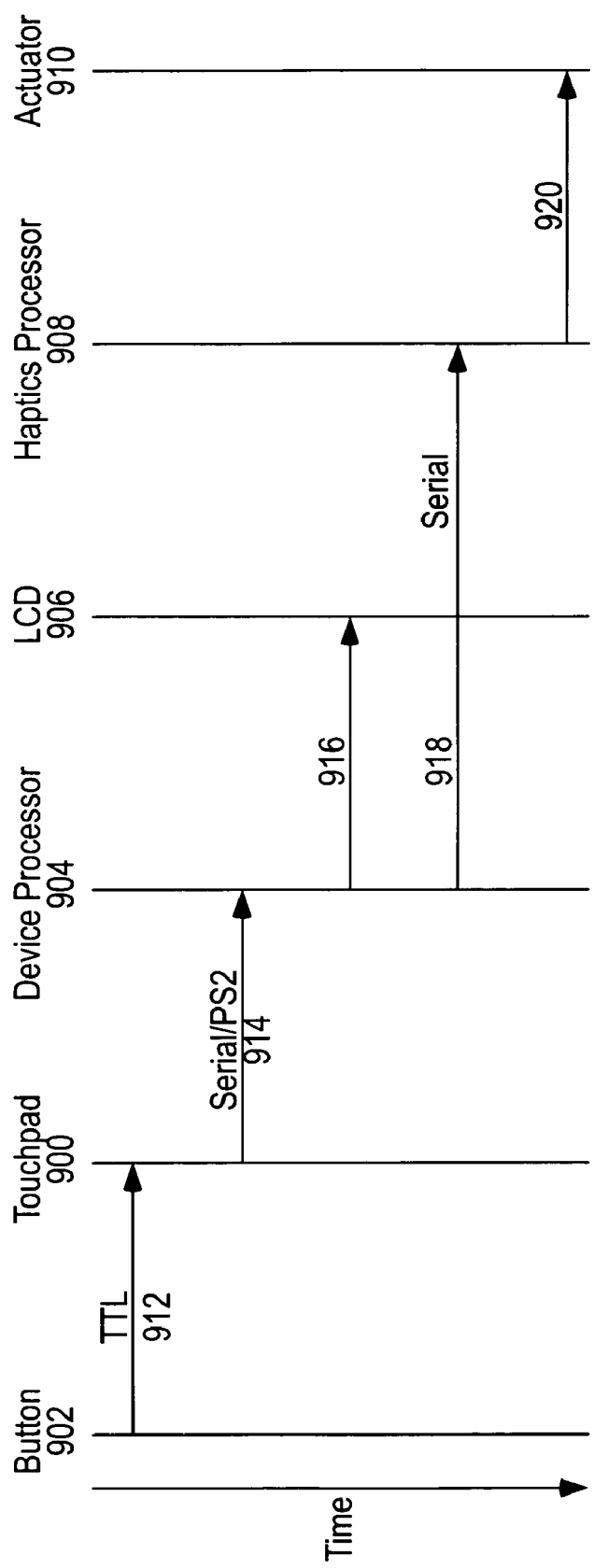

SYSTEM AND METHOD FOR PROVIDING ROTATIONAL HAPTIC FEEDBACK

CROSS-REFERENCE TO RELATED APPLICATIONS

This application claims priority to U.S. Provisional Application No. 60/419,984 filed Oct. 20, 2002, the entire disclosure of which is incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

FIELD OF THE INVENTION

The present invention generally relates to providing haptic feedback to user interface devices. The present invention more particularly relates to providing haptic feedback for a rotational touchpad.

BACKGROUND

Designers and manufacturers of hand-held devices, such as personal digital assistants, cell phones, and MP3 players are constantly striving to improve the interfaces of these devices. One relatively recent innovation has been the introduction of the touchpad. The touchpad has become a common feature of conventional laptops and has begun to appear in hand-held devices as well.

One such hand-held device is a personal MP3 player. Conventional MP3 players and other such devices include a circular touchpad, which is used to navigate menus, lists, and other user interface elements. The user interfaces may also include various other elements, including conventional buttons.

SUMMARY

Embodiments of the present invention provide systems and methods for providing rotational haptic feedback. One embodiment provides haptic cues to a touch-sensitive input device having a rotary degree of freedom. One such embodiment comprises a touch sensitive input device is configured to move in a rotary degree of freedom, and an actuator configured to produce a rotational force on the touch-sensitive input device.

In one embodiment, the actuator comprises an electromagnetic core configured to produce force on a magnet affixed to the touch-sensitive input device. In other embodiments, a motor provides the rotational force. For example, in one embodiment, the motor drives a belt. The belt is configured to rotate the touch-sensitive input device. In another embodiment, the motor drives a flexure, which is configured to rotate the touch-sensitive input device.

Further details and advantages of embodiments of the present invention are set forth below.

BRIEF DESCRIPTION OF THE FIGURES

These and other features, aspects, and advantages of the present invention are better understood when the following Detailed Description is read with reference to the accompanying drawings, wherein:

FIGS. 9C and 9D are timing diagrams, illustrating two methods of passing signals between the elements shown in FIG. 9A in embodiments of the present invention;

DETAILED DESCRIPTION

Embodiments of the present invention include systems and methods for providing rotational haptic feedback. One embodiment includes a circular touchpad activated by a moving magnet actuator. Other embodiments include small motors attached to a user interface element to provide a rotational vibrotactile sensation. These and other embodiments are described below.

Figure 1A:
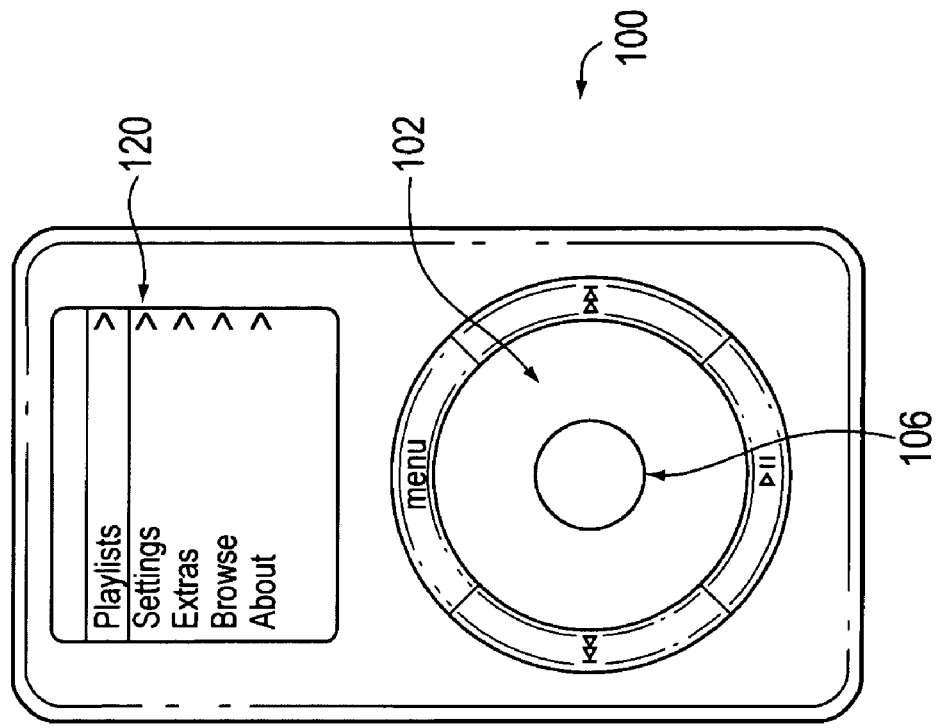
FIG. 1A is an MP3 device utilizing one embodiment of the present invention.
Figure 1A:
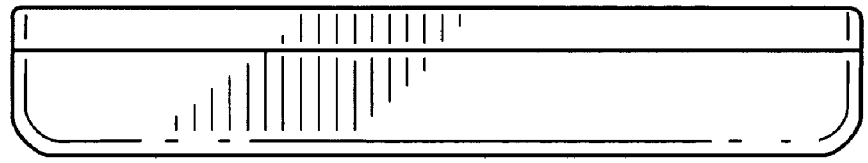
Figure 1A:
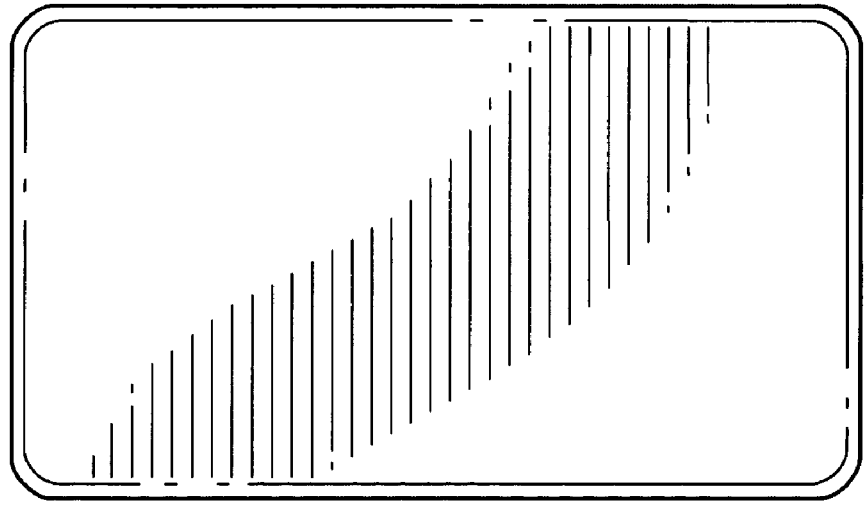

Referring now to the drawings, in which like numerals indicate like elements throughout the several figures, FIG. 1A illustrates an MP3 player. The personal MP3 player includes a touch-sensitive input device, touchpad 102. Touchpad 102 senses the position of a conductor, such as a finger, on the surface of the touchpad. The touchpad is further able to provide a position, comprising X and Y parameters, as well as a pressure, Z parameter, as an output signal. The touchpad 102 shown in FIG. 1 utilizes capacitance, however, an embodiment of the present invention may be implemented in conjunction with any touch-sensitive input device, including resistive and membrane-switch touch-sensitive input devices.

Capacitance-based touchpads are well known to those skilled in the art, and therefore, only a basic description of their function is provided herein. A capacitance touchpad, such as touchpad 102 shown in FIG. 1, includes two sets of wires, which are perpendicular to one another and configured so that a gap is formed between them. When a user places a conductor, such as a finger, on the touchpad 102, wires of the two perpendicular sets are brought together and form a capacitance. The touchpad 102 measures which of the wires in each of the two sets has the most capacitance to determine where the conductor is touching the touchpad 102 and, based on this information, provides the X and Y coordinates of the position of the conductor on the touchpad 102.

The touchpad 102 also provides a pseudo pressure, Z. The pseudo pressure is based on the amount of capacitance resulting from the conductor touching the touchpad 102. Accordingly, the amount of capacitance is not a direct measure of pressure but rather a pseudo pressure.

The personal MP3 player shown in FIG. 1 also includes an LCD display 120. In FIG. 1A, the LCD 120 is displaying a menu. A user uses the touchpad 102 to navigate the menu. When the user moves a finger in a counterclockwise direction on the touchpad 102, signals are sent by the touchpad 102 to a processor (not shown). Program code executing on the processor interprets the signals as a command to move down through the list of items in the menu.

The processor executes computer-executable program instructions stored in memory. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, and JavaScript.

Referring still to FIG. 1A, when the processor executes the commands to redraw the display 120, the processor also sends a signal to a second processor or a second program. The signal includes information necessary to create a haptic cue. The second processor computes the waveform necessary to create the cue and sends signals to an actuator. The actuator executes the waveform, causing the touchpad to rotate slightly back and forth. The user senses a vibrotactile effect that approximates a detent. Other cues, responses, vibrotactile effects, and other features may be provided.

An embodiment of the present invention may utilize any type of touch-sensitive input device, such as the touchpad 102 described above, a touch panel, or other device. The input device may be of any shape, including round and rectangular shapes. The input device is configured to move in a rotary degree of freedom. An actuator is configured to produce a rotational force on the touch-sensitive input device.

In one embodiment of the present invention, the range of motion in the rotary degree of freedom is limited. To achieve the limitation, either the motor or the input device comprises means for limiting motion in the rotary degree of freedom. For example, in one embodiment, the motor comprises two rubber end stops at each limit of rotation. In another embodiment, the touch-sensitive input device includes end stops to limit its range of motion.

Various types of actuators may be utilized in an embodiment of the present invention. For example, in one embodiment, the touch-sensitive input device comprises one or more magnets and the actuator comprises a magnetic core, such as an E-core. When the magnetic core is energized, the core produces a rotational force on the input device.

In another embodiment, a motor provides the rotational force. In one such embodiment, the motor drives a belt, which is configured to produce the rotational force directly or indirectly on the input device. In another embodiment, the motor is connected to a flexure, such as a brass flexure, which produces rotational force on the input device.

In one embodiment of the present invention, the freedom of movement of the touch-sensitive input device serves to increase the effectiveness of a vibration imparted on the input device. By isolating the input device from the housing or other ground, the input device is able to move more freely in the rotary degree of freedom when vibrated. In one such embodiment, the actuator comprises an eccentric rotating mass mounted on a motor.

An embodiment of the present invention may perform various methods. For example, in one embodiment, the processor receives an input signal and, in response, generates an output signal configured to cause an actuator to produce a rotational force on the touch-sensitive input device. In one such embodiment, the output signal is configured to impart a "pop" sensation on the input device.

Figure 1B:
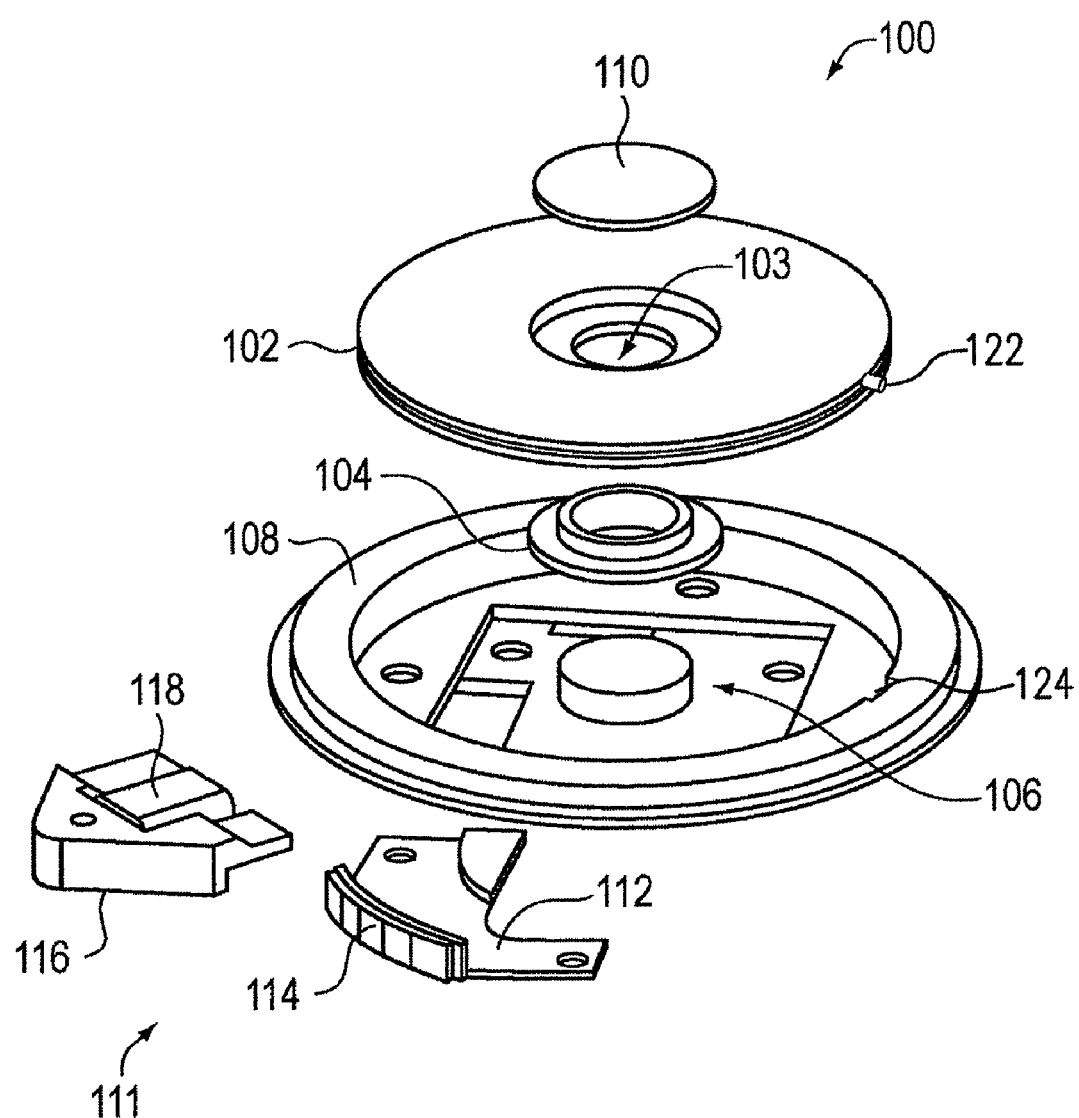
FIG. 1B is an exploded view of a user interface according to one embodiment of the present invention.

FIG. 1B is an exploded view of one embodiment of a user interface according to the present invention. The user interface 100 shown may be used an any one of a variety of devices, including, for example, personal digital assistants, cell phones, and MP3 players.

Referring again to FIG. 1B, the user interface 100 shown includes a circular touchpad 102. The touchpad comprises a user interface device often used in place of a mouse or other similar pointing device. One embodiment of a touchpad provides a surface upon which a user slides a finger or other pointing device. Embodiments of touchpads include those that contain a two-layer grid of electrodes connected to an integrated circuit, and rely on coupling capacitance. The upper layer of the grid contains vertical electrode strips and the bottom layer contains horizontal electrode strips. The integrated circuit measures capacitance at the intersections of the horizontal and vertical strips. Movement of the user's finger across the touchpad causes changes in the capacitance. A processor interprets the change in capacitance as a particular user input. The embodiment shown includes a circular touchpad. Touchpads, buttons, and other interface elements of both circles and other shapes may be used in embodiments of the present invention.

In the embodiment shown in FIG. 1B, the touchpad 102 provides a one-dimensional, single axis of movement. Movement around the touchpad causes a change in the list position or to other interface parameters. For example, in one embodiment, if the user moves a finger counterclockwise on the touchpad 102, a controller (not shown) associated with the touchpad 102 interprets the movement as down or right. If the movement is clockwise, the controller interprets the movement as up or left.

The touchpad 102 in FIG. 1B has a hole 103 in its center. In other embodiments, the touchpad 102 or other interface element does not have a hole. A bushing 104 is inserted into the hole 103 from the underside of the touchpad 102 as shown. The bushing 104 both supports and physically isolates the touchpad 102 from the other elements of the user interface 100, allowing the touchpad 102 to rotate about a central axis. The nature of the bushing 104 shown in FIG. 1B does not allow the touchpad to move up and down or side to side. Other embodiments allow such movements.

The bushing 104 or other support preferably offers stability combined with low friction. In the embodiment shown in FIG. 1B, the bushing 104 is constructed from a low-friction plastic material. In other embodiments, the bushing 104 is constructed from metal or another suitable material. The placement of the bushing 104 allows the touchpad to rotate in response to an actuator.

In other embodiments, the bushing 104 may be replaced with linkages or alternative pivots to allow the touchpad 102 to react the forces. An embodiment may utilize roller elements or balls to support the magnets against the fixed steel to maintain the optimal gap. In one embodiment, the touchpad 102 does not include a center hole. Such an embodiment may eliminate physical switches and implement buttons, including the center button, as virtual buttons. The touchpad 102 may also include additional distinct regions anywhere on its surface to represent buttons. By utilizing a rotational movement for a circular touchpad, the embodiment shown in FIG. 1B provides a natural-feeling sensation to a user. The sensation feels the same everywhere on the touchpad in the embodiment shown; in other embodiments, the construction of waveforms and other means may be employed to vary the sensation at different locations on the touchpad.

Preferably the rotation of the touchpad 102 is limited to optimize the haptic cue. A user experiences a haptic cue optimally when the user is unaware of the actual movement of the user interface and instead feels only the cue itself In one embodiment, a pin 122 is attached to the touchpad 102. The pin sits in a slot 124 in the button carrier 106. The slot is parallel to the touchpad 102 so that when the touchpad 102 rotates, the pin travels within the slot. In a preferred embodiment, the slot has a length of 2 millimeters. An approximately 2-millimeter stroke is preferred for providing a haptic cue without a user realizing that the touchpad 102 is rotating. This small displacement occurs in response to an actuator and the rotation is felt by the user as a real time haptic cue synchronized with the user interface display events.

Self-centering of the touchpad 102 is also preferable in an embodiment of the present invention. The actuator 111 shown provides self-centering in the form of a high reluctance torque, which is also referred to as "cogging." The natural tendency of the actuator 111 to spring center itself keeps the system near equilibrium and prevents the finger dragging force from rotating the touchpad 102 to one limit stop where only half of a waveform defining a haptic cue would be felt. Other embodiments may realize such spring centering with the addition of springs; however, the addition of springs would add additional resistance that would have to be overcome by the output force of the actuator 111.

The bushing 104 also has an opening in the middle. The opening allows the bushing to be situated around a central button 106 of a button carrier 108. The button carrier 108 of the embodiment shown supports conventional buttons. In other embodiments, the button carrier 108 may be constructed to accommodate other button types. A button cap 110 snaps onto the central button 108 and secures the bushing 104 and the touchpad 102.

As described above, the bushing 104 allows the touchpad 102 to rotate. An actuator in communication with the touchpad 102 provides force to rotate the touchpad 104 and produce a haptic effect. The actuator in the embodiment shown in FIG. 1B is a small, moving magnet actuator 111. The actuator 111 uses a radial geometry and rotational support to create magnetic attractive forces. The magnetic assembly and poles are curved. Such a configuration creates a constant nominal magnetic gap and produces a rotational torque.

In such an embodiment, the stationary steel may be formed into distinct shapes to fit in various locations in a preexisting device design without affecting the stationary steel's ability to create a magnetic field. Such an embodiment may include various shapes and be implemented in various positions within a device.

The actuator includes a backing plate 112. In the embodiment shown, the backing plate 112 is made from steel. Attached to the backing plate 112 is a two-pole magnet 114. The two-pole magnet 114 may comprise a single, curved two-pole magnet or a series of smaller magnets arranged to form a two-pole magnet. However, the two-pole magnet 114, may be created using a series of smaller magnets as is shown in FIG. 1B. In the embodiment shown, the two-pole magnet 114 comprises six small magnets, three north and three south. The steel backing plate 112 and the magnet 114 rotate with the touchpad 102 and are therefore supported indirectly by the bushing 104.

In the embodiment shown in FIG. 1B, a magnetic field causes the touchpad 102, steel backing plate 112, and magnet 114 to rotate. An E-Core 116 creates the magnetic field. The E-Core 116 shown is a ferromagnetic material created to roughly approximate the shape of the letter E. The central pole of the E-Core 116 is wrapped with a coil 118. When current goes through the coil 118 it influences the magnetic field that is coupled between the magnets in the two-pole magnet 114. And the current that goes through that coil 118 produces forces on the magnet 114 and results in a torque about the center of rotation of the circular touchpad 102.

The E-Core 116 is mounted in the embodiment such that the poles of the E-Core maintain an optimal gap from the magnet 114 mounted on the backing 116. Therefore, when the E-Core 116 emits a magnetic field, the magnet 114 moves. And since the magnet is attached to the backing plate 112, which is attached to the touchpad 102, the touchpad 102 moves as well. The structure is arranged such that the magnet 114, and thus the touchpad 102, moves rotationally when the actuator 111 is activated. A controller (not shown) controls the magnetic field precisely so that the movement approximates a waveform, which is interpreted by the user of the touchpad 102 as a specific vibrotactile effect.

Figure 2:
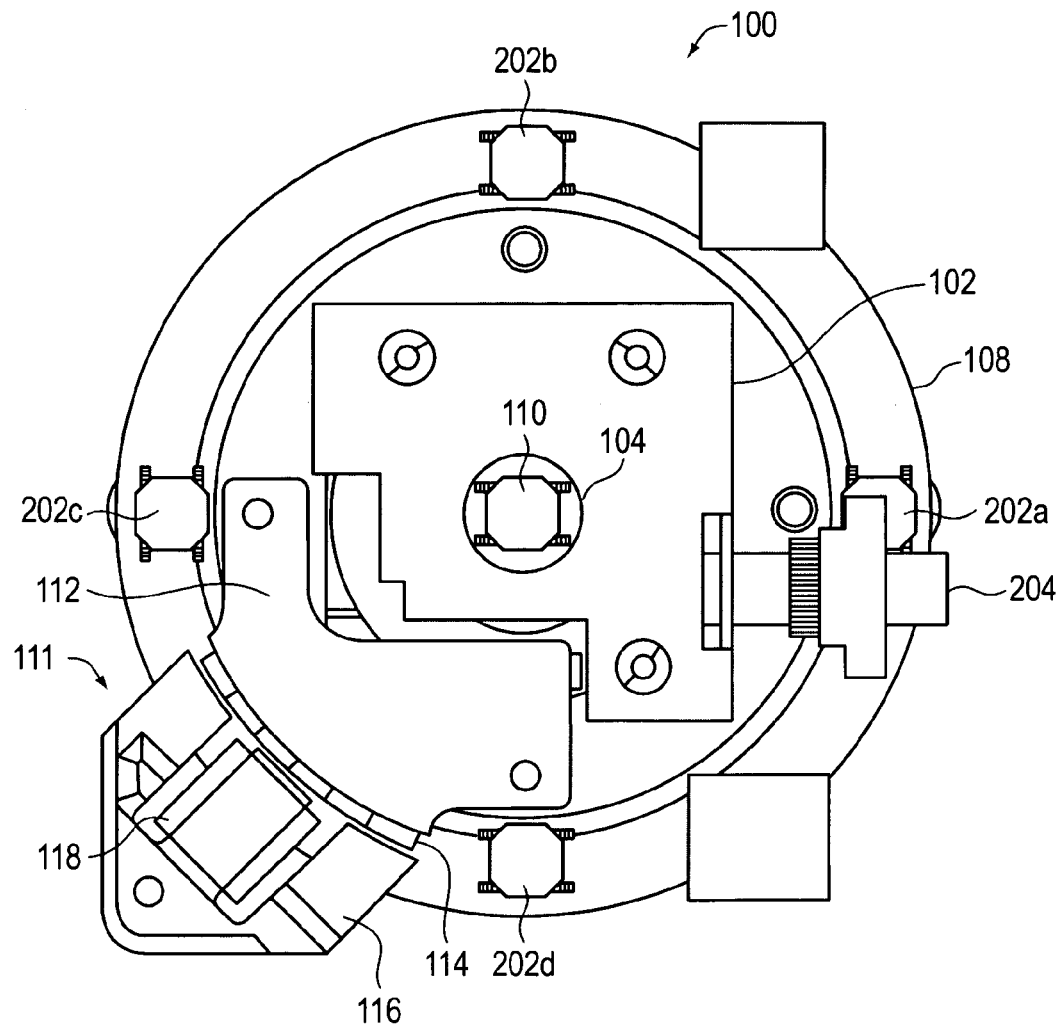
FIG. 2 is a non-exploded, bottom view of the user interface shown in FIG. 1B in one embodiment of the present invention.

FIG. 2 is a non-exploded, bottom view of the user interface 100 shown in FIGS. 1A and 1B. The touchpad 102 is mounted on a bushing 104. The bushing 104 is mounted in the center of the button carrier 106. FIG. 2 illustrates the spatial relationship between the backing steel 112 and attached two-pole magnet 114 and the poles of the E-Core 116. Since the poles of the E-Core are curved, a constant, optimal gap is maintained between the poles and the magnet 114. FIG. 2 also illustrates four conventional buttons 202a-d located on the button carrier 106 and visible on the interface 100 of the personal MP3 player shown in FIG. 1B. Also shown is the control cable 204 that carries signals from the touchpad 102 to a processor (not shown).

Figure 3:
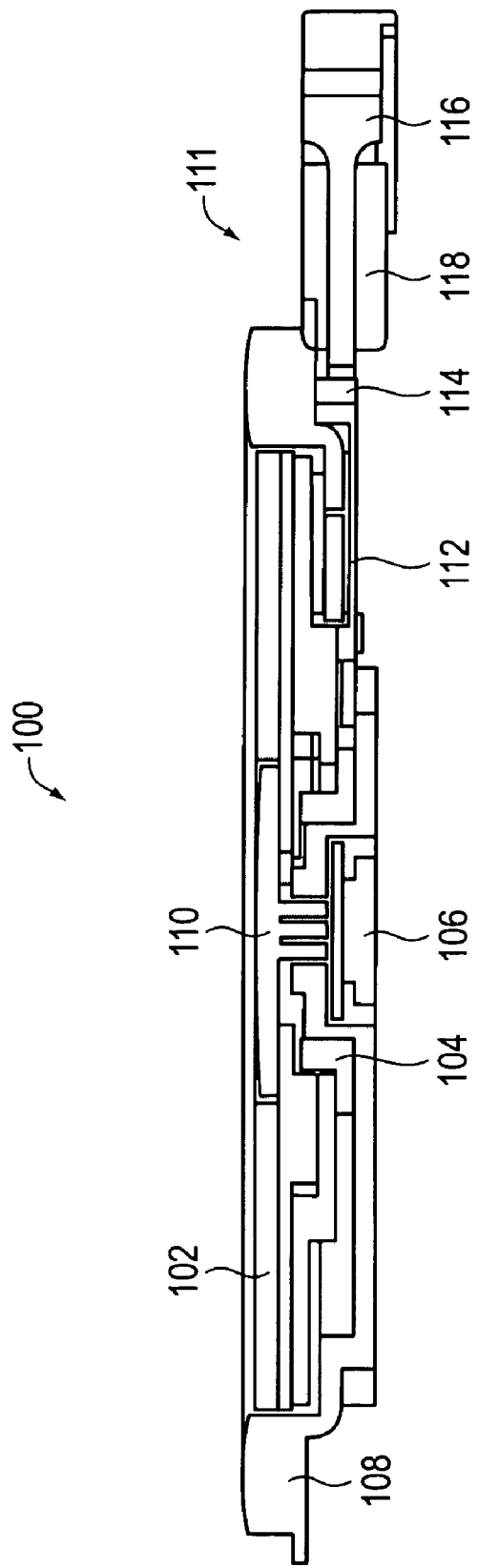
FIG. 3 is a cross sectional view of the user interface depicted in FIGS. 1B and 2 in one embodiment of the present invention.

FIG. 3 is a cross sectional view of the user interface 100 depicted in FIGS. 1B and 2. FIG. 3 further illustrates the physical relationship between the touchpad 102, the bushing 104, and the central button in the button carrier 108. FIG. 3 also illustrates the physical relationship between the touchpad 102 and the actuator structure 111.

Figure 4:
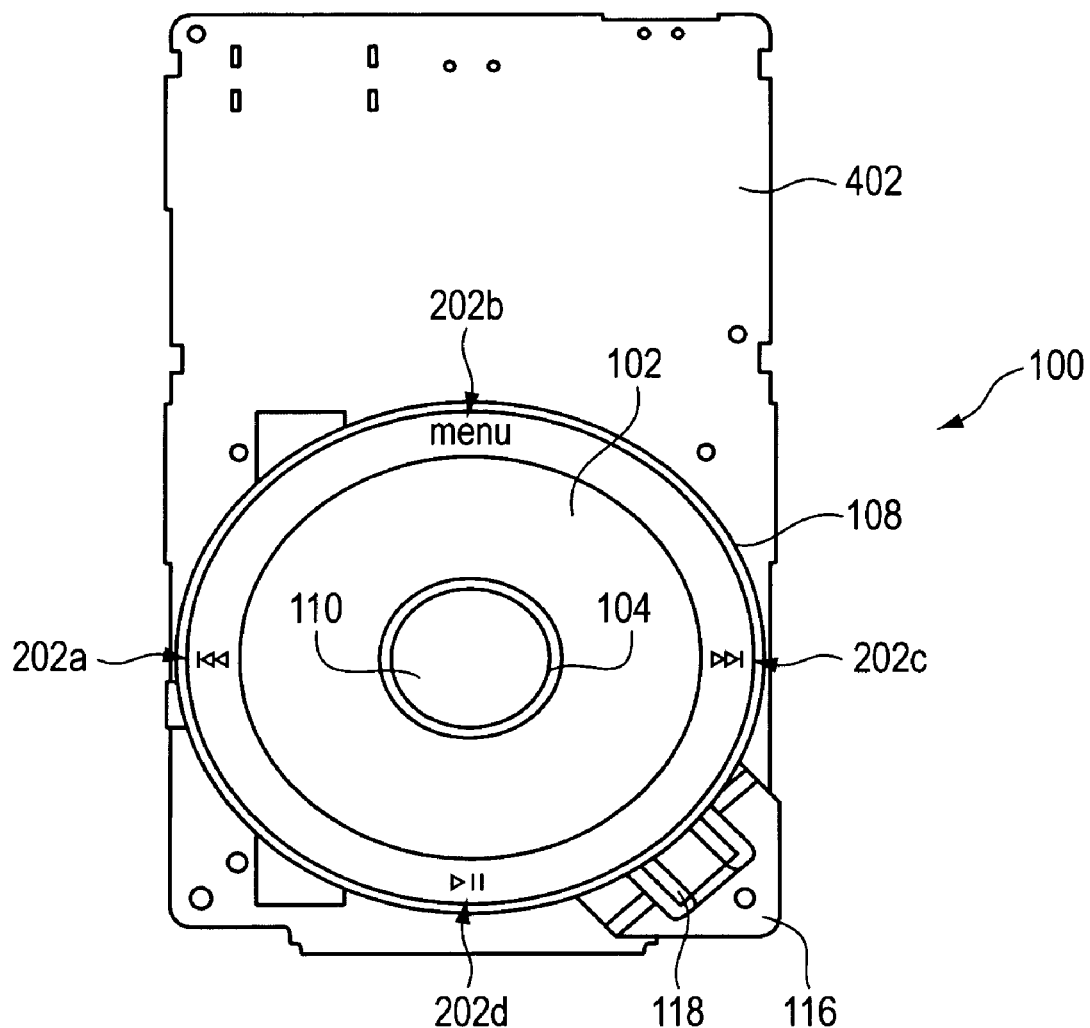
FIG. 4 is a top view of the user interface shown in FIGS. 1-3 in one embodiment of the present invention.

FIG. 4 is a top view of the user interface 100 shown in FIGS. 1-3. FIG. 4 illustrates the relationship between the various elements of an embodiment as perceived by the user. In addition, in the embodiment shown, the E-Core 116 is attached to the corner of a printed circuit board (PCB) 402. The PCB 402 provides a solid mounting point for the E-Core 116. In other embodiments, the E-Core 116 may comprise an elongated E-shaped conductive material attached to another element in a device. As is described above, the material may be formed in many different shapes and lengths and placed anywhere within a particular device. The ability to conform the E-Core 116 to a shape necessary for packaging within an existing design provides great flexibility in implementing an embodiment of the present invention. This flexibility also allows an embodiment to be implemented with minimal impact on the pre-existing components within a device. Therefore, embodiments of the present invention may be implemented in the design of new devices or created as replacement kits for existing devices. Regardless of the shape utilized, the various embodiments of the E-Core 116 maintain a consistent gap between the magnet 114 and the poles of the E-Core 116 preferably.

An embodiment of the present invention is particularly advantageous for providing haptic feedback in small devices, such as a personal digital assistant (PDA), cell phone, or MP3 player. Such devices conventionally include circular touchpads such as the touchpad 102 shown in FIGS. 1A and 1B or may include rotary dials or other similar user interface elements (embodiments of the present invention may be employed to provide haptic feedback to all such elements). The user of such a device utilizes the circular touchpad to navigate the menus 404 of the device. An embodiment of the present invention may be implemented in the device to provide haptic cues in response to user interface events, such as the change of a displayed cursor position or reaching the end of a list of items in a menu.

Such a device may be created by adding a processor (not shown) and firmware to the embodiment shown in FIGS. 1-4 that is capable of receiving real-time, serial data from the device, processing the events and, in response, generating a signal. Alternatively, the device's primary processor may perform the functions required for an embodiment. The processor receives input and generates signals for the coil. In one embodiment, an amplifier (not shown) accepts the signal generated by the processor and supplies a high current signal to the E-Core 116. The current drives the coil 118; whose field acts in a magnetic circuit arranged in such a way that it produces a torque on the circular touchpad 102.

The amplifier may be, for example, a DC or AC-coupled audio amplifiers. However, an AC-coupled audio amplifier may be preferable in many environments because of the relatively low cost, the availability of off-the-shelf components, and the ability to use a larger range of coil resistance than is practical for a DC-coupled amplifier. Also, the AC-coupled amplifier may be bypassed with large capacitance values to permit very high peak root-mean-square (RMS) currents while preventing accidental overheating.

Various other embodiments of the present invention are capable of providing force feedback in rotational interface elements. These embodiments are capable of implementation in a small device, such as an MP3 player, a personal digital assistant (PDA), or a digital camera. The actuator in small devices is preferably 6 mm or less in height and requires low RMS current on the order of 150-200 mA.

Figure 5:
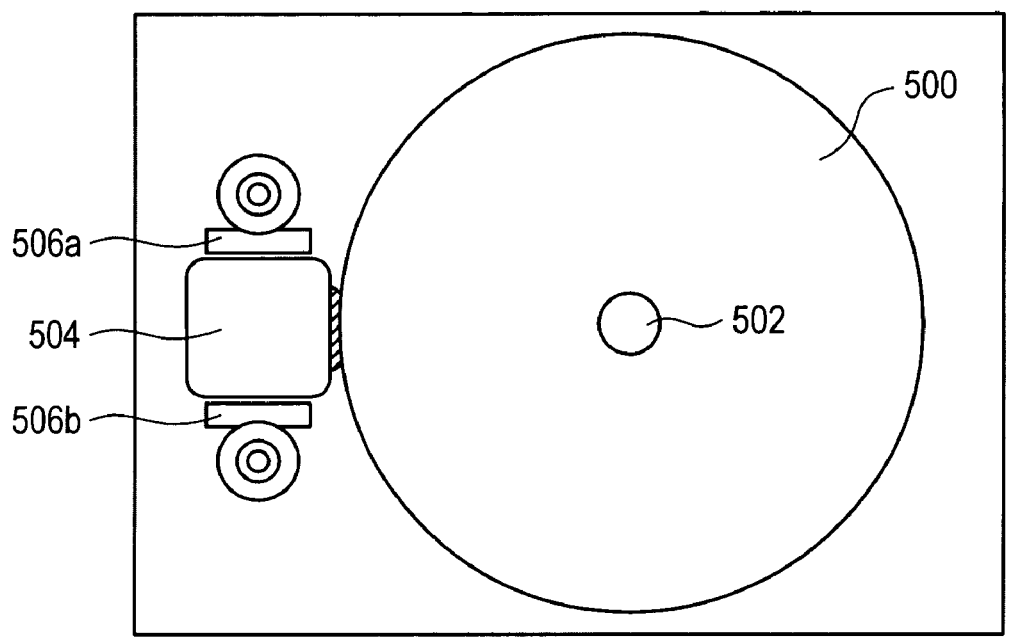
FIG. 5 is a top view of one alternate embodiment of the present invention.

FIG. 5 is a top view of one alternate embodiment of the present invention in which an eccentric rotating mass motor providing feedback for a rotational touchpad. In the embodiment shown, a touchpad 500 rotates around a central axis 502. The touchpad 500 is attached to a small motor 504 near the outer edge of the touchpad 500. A fastener, such as a screw, attaches the motor 504 and touchpad 500. The motor 504 shown in FIG. 5 is commonly referred to as a coin style vibration motor. The motor 504 is of a type conventionally used in pagers to provide a vibration and is particularly advantageous for use in a small device because of its small profile and ability to fit inside of a small case. The motor 504 shown in FIG. 5 operates on 3.3 volts, are approximately 2 centimeters in diameter and 5 millimeters in height.

The motor 504 includes an eccentric mass. The eccentric mass and all of the windings and additional components of the motor operate within that volume. The motor 504 naturally produces a vibration of approximately 80 hz. However, in the embodiment shown, the motor is driven bi-directionally to create frequencies greater than 80 Hz.

The motor 504 is attached to the underside of the touchpad 500 and rotates in the same plane as the touchpad 500 rotates. The motor rotation is limited. Two rubber end-stops 506a, b limit the rotation of the motor 504. Preferably, the rotation of the touchpad 500 is limited. In the embodiment shown, since the rotation of the motor 504 is limited and the motor 504 is attached to the touchpad 500, the rotation of the touchpad 500 is limited as well.

The embodiment shown in FIG. 5 is extremely strong when operating in DC mode and is able to vibrate the touchpad 500 quite violently, producing a distinct, strong "pop" sensation. Careful adjustment of the effect length results in an extremely convincing effect. Such an embodiment may be used to perform a standard vibration function along with creating a vibrotactile-effect. The ability to combine multiple functions in a single device is a particularly advantageous feature of this embodiment.

The use of the embodiment shown in FIG. 5 may provide poor high-frequency response because during experimentation at frequencies above 15 Hz, the motor no longer rotates in ERM mode, and force began to drop off. By 100 Hz, the forces are difficult to sense. Also, the motor 504 shown required 70 ms to achieve full ERM forces. Also, the embodiment shown produced only a limited number of haptic effects. These attributes may be eliminated or reduced by employing a different type of, or more advanced, motor.

The embodiment shown in FIG. 5 may be modified in various ways to affect its ability to provide haptic feedback. For example, the coin-style vibration motor may include a spring mount attached between the motor 504 and the touchpad, converting the motor 504 into a highly-eccentric rotating mass (HERM). Also reducing the mass of the touchpad 500 and decreasing any vibration present in the central axis 502 may enhance the effect of the motor vibration.

Figure 6:
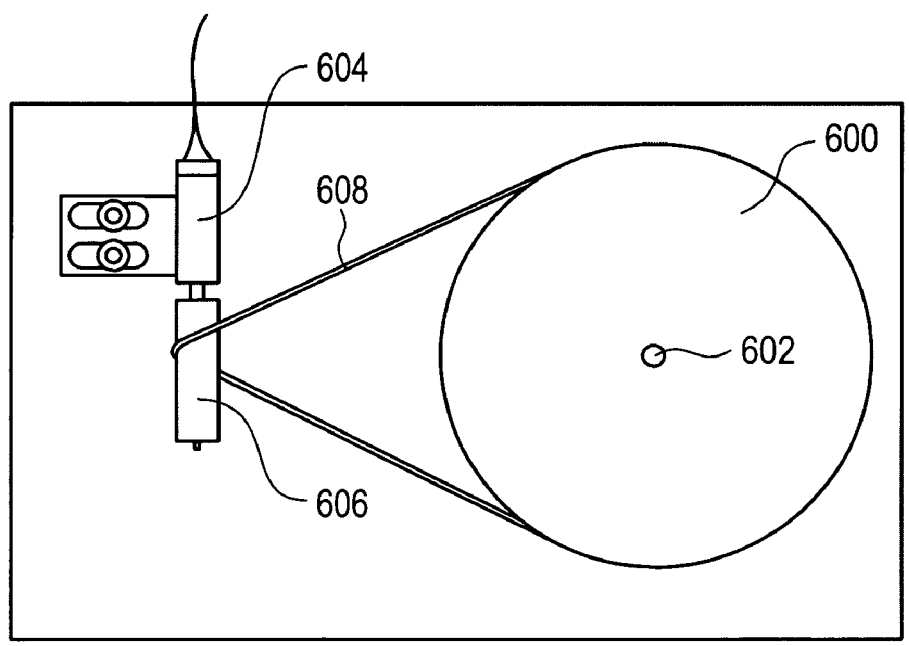
FIG. 6 is a top view of an embodiment of the present invention utilizing a belt drive actuator.
Figure 7:
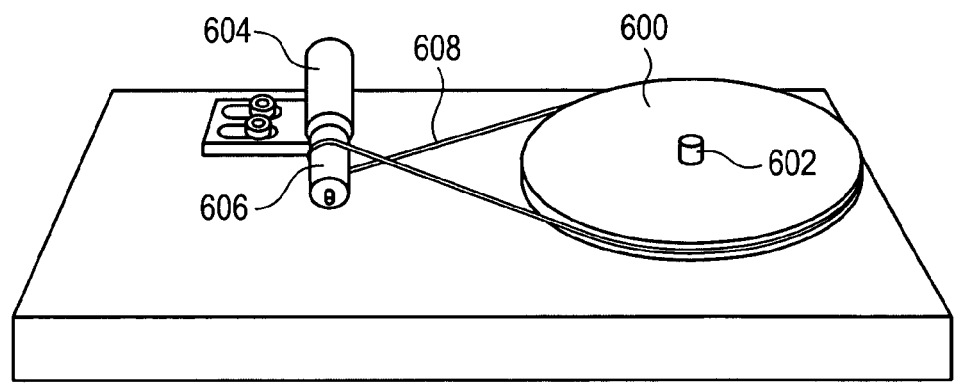
FIG. 7 is a side view of the embodiment shown in FIG. 6.

FIG. 6 is a top view of yet another embodiment of the present invention. The embodiment shown in FIG. 6 utilizes a belt-drive system to provide haptic effects. FIG. 7 is a side view of the embodiment shown in FIG. 6. In the embodiment shown, a touchpad 600 rotates around a central axis 602. A small DC motor 604 turns a capstan or pinion 606. A belt 608 wraps once around the capstan, twists 90° and then wraps around the touchpad 600. The belt 608 sits in a pulley groove machined into the outside edge of the touchpad 600. In operation, the motor 604 is driven back and forth to provide haptic sensations in the touchpad 600. An embodiment, such as the one shown in FIGS. 6 and 7, is capable of providing feedback to a touchpad over either a limited range of rotation, or over a large range of rotation. However, in a touchpad that rotates over a large range, such as 360°, the motor, capstan, and belt still provide a vibrotactile effect as opposed to a kinesthetic effect.

The embodiment shown in FIGS. 6 and 7 provides high torque amplification. For example when a small capstan 606 with a 6 mm diameter combines with a large touchpad 600 with a 52 mm diameter, the embodiment can provide an 8.7:1 amplification, resulting in a measured peak torque at the touchpad 600 of 2.2 mNm. This amplification allows a relatively weak motor to product a strong enough vibration to deliver a convincing vibrotactile force.

An embodiment such as the one shown in FIGS. 6 and 7 provides a compact assembly. The distance between the center of rotation of the touchpad 600 and motor 604 is determined by the o-ring diameter. Therefore, a smaller diameter o-ring provides an even more compact implementation. The embodiment shown produces sensations up to approximately 200 Hz. Although the belt 608 shown in FIGS. 6 and 7 is a rubber belt, the belt 608 may comprise a variety of materials, including steel cable, wire, and string. The rubber belt is advantageous because is it self-tightening and therefore requires no external spring or large tension in the cable. Additionally, since the rubber belt 608 is not fixedly attached to the touchpad 102, the belt 608 is never fully grounded, i.e., the belt 608 continues to move around the touchpad 102 when the touchpad 102 stops moving. Accordingly, even if the user grounds touchpad 600, the motor continues to rotate and add energy to the system, i.e., spin the belt 608. If the motor 604 were to stall, the power consumption would increase.

Various modifications of the embodiment shown in FIGS. 6 and 7 may be implemented. For example, a stiffer belt material would reduce flex and stretch and thereby increase the efficiency of energy transmission. Also, the belt 608 may wrap around the capstan 606 multiple time, eliminating the potential for belt slippage and movement across the capstan 606. In addition, adhering the belt 608 to the touchpad 600 would reduce the potential for slipping and the corresponding energy loss. In other embodiments, a smaller motor 606 reduces the size of the device.

Figure 8:
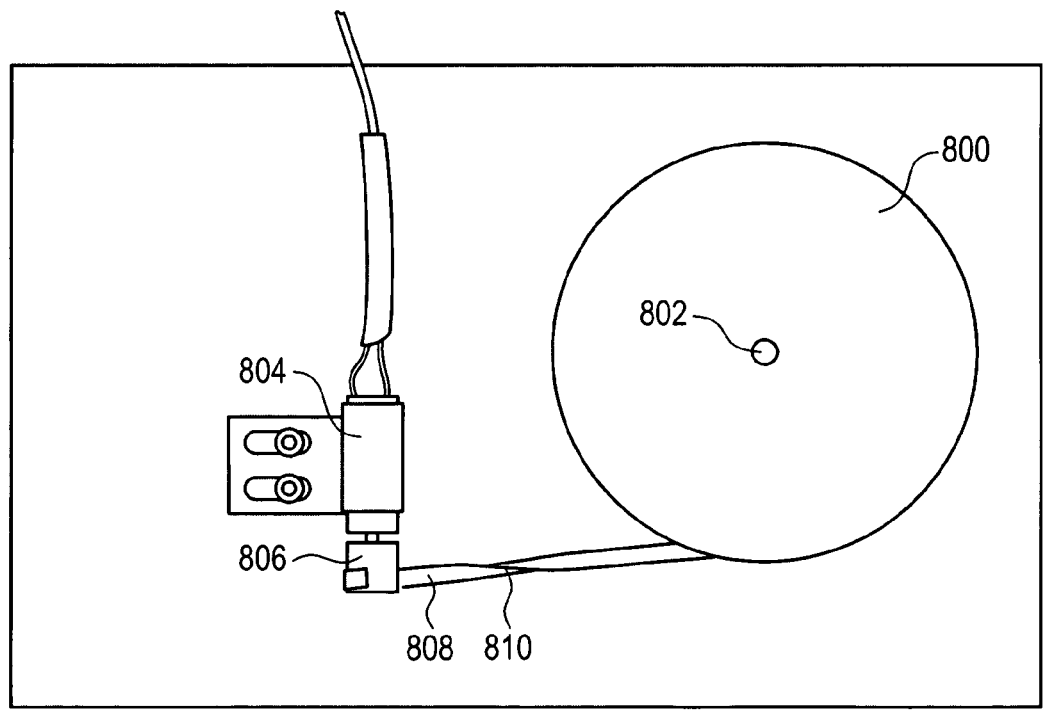
FIG. 8 is a top view of an embodiment of the present invention utilizing a flexure actuator.

FIG. 8 illustrates another embodiment of the present invention. Like the embodiment shown in FIGS. 6 and 7, the embodiment shown in FIG. 8 includes a small DC motor 804 with a pinion 806. The pinion 806 is attached to a brass flexure 808. The brass flexure 808 is bent in two places 810 to form hinges. The flexure 808 is also attached to the touchpad 800, which again rotates around a central axis 802. As the motor 804 rotates back and forth, it provides haptic feedback to the touchpad 800.

The bend 810 in the brass flexure 808 provides a degree of freedom necessary to rotate the touchpad 800 from side-to-side using a pinion 806 rotating up and down. A metal flexure is preferable to a plastic flexure in a small device. The range of rotation of the touchpad 800 is preferably limited.

The embodiment shown in FIG. 8 provides high torque amplification with no backlash over a limited rotation angle. The combination of the small pinion 806 and the large touchpad provides the amplification. For example, the pinion pictured has a 6 mm diameter and the touchpad 800 has a 40 mm diameter, providing a 6.7:1 amplification, allowing a relatively weak motor to deliver convincing vibrotactile forces. The device shown provides a measured peak torque 1.8 mNm between approximately 0 and 200+ Hz. Although a metal flexure is preferred, other materials may be used to create the flexure, such a polypropylene or spring steel. One advantage of spring steel is its self-centering properties, i.e., the spring hinge finds a neutral position. As described above, a smaller motor decreases the size of an embodiment. Embodiments may also use a single-piece, molded hinge. The embodiment shown in FIG. 8 is preferably a large diameter touchpad 102. The touchpad 102 is preferably not a continuous turn device An embodiment of the present invention includes processing logic. The processing logic may be in the form on computer program code stored in a computer-readable-medium, such as a programmable read-only memory (ROM). Processing logic so stored is often referred to as firmware. Firmware according to the present invention accepts parameters regarding the context in which the user is operating as well as user interface parameters to determine the type of haptic effect to create. The firmware may perform other tasks as well.

Figure 9A:
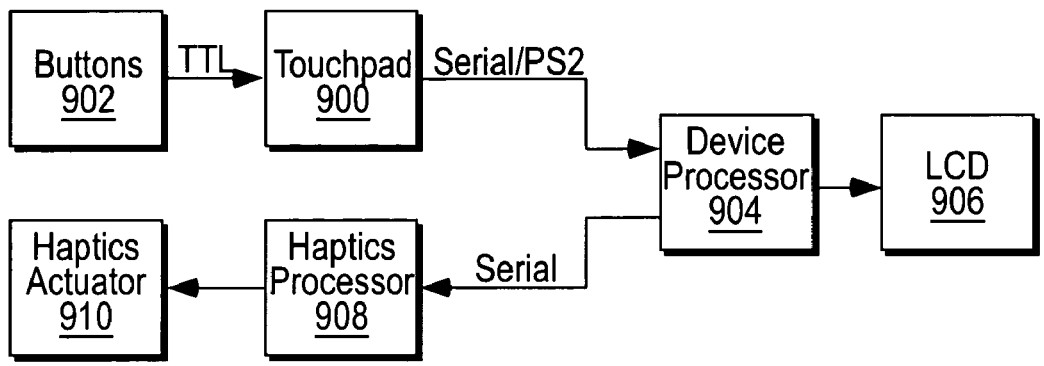
FIGS. 9A and 9B are block diagram, illustrating communications occurring between various elements in embodiments of the present invention.
Figure 9B:
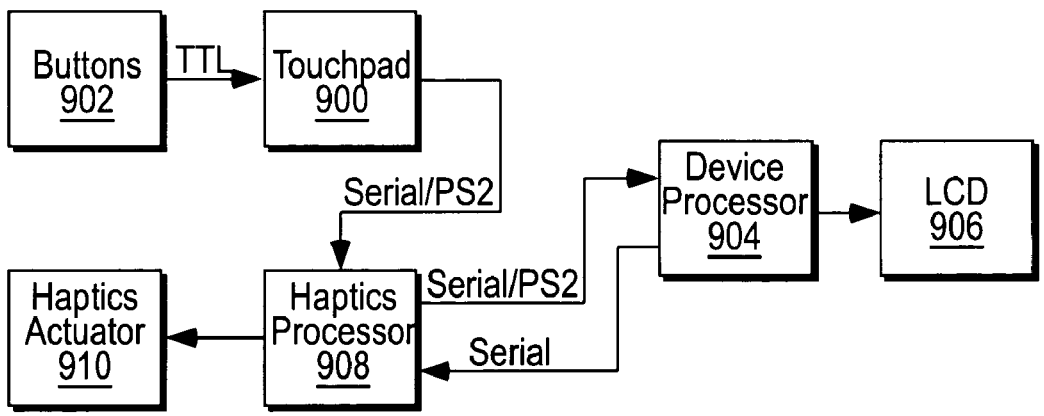

FIGS. 9A and 9B are block diagram, illustrating communications occurring between various elements in embodiments of the present invention. In the embodiment shown in FIG. 9A, a touchpad 900 receives signals from buttons 902. The touchpad 900 also communicates with a device processor 904. The device processor 904 receives the interface inputs and, using software and/or firmware, determines the appropriate signals to transmit to the liquid crystal display (LCD) 906. In an embodiment of the present invention, the device processor 904 also sends serial signals to a haptics processor 908. The haptics processor 908 utilizes firmware to compute forces and corresponding actuator commands. The haptics processor 908 communicates the resulting commands to a haptics actuator 910. In the alternative embodiment shown in FIG. 9B, the touchpad 900 communicates signals to the haptics processor 908, which communicates original or modified serial or PS/2 signals to the device processor 904.

Figure 9D:
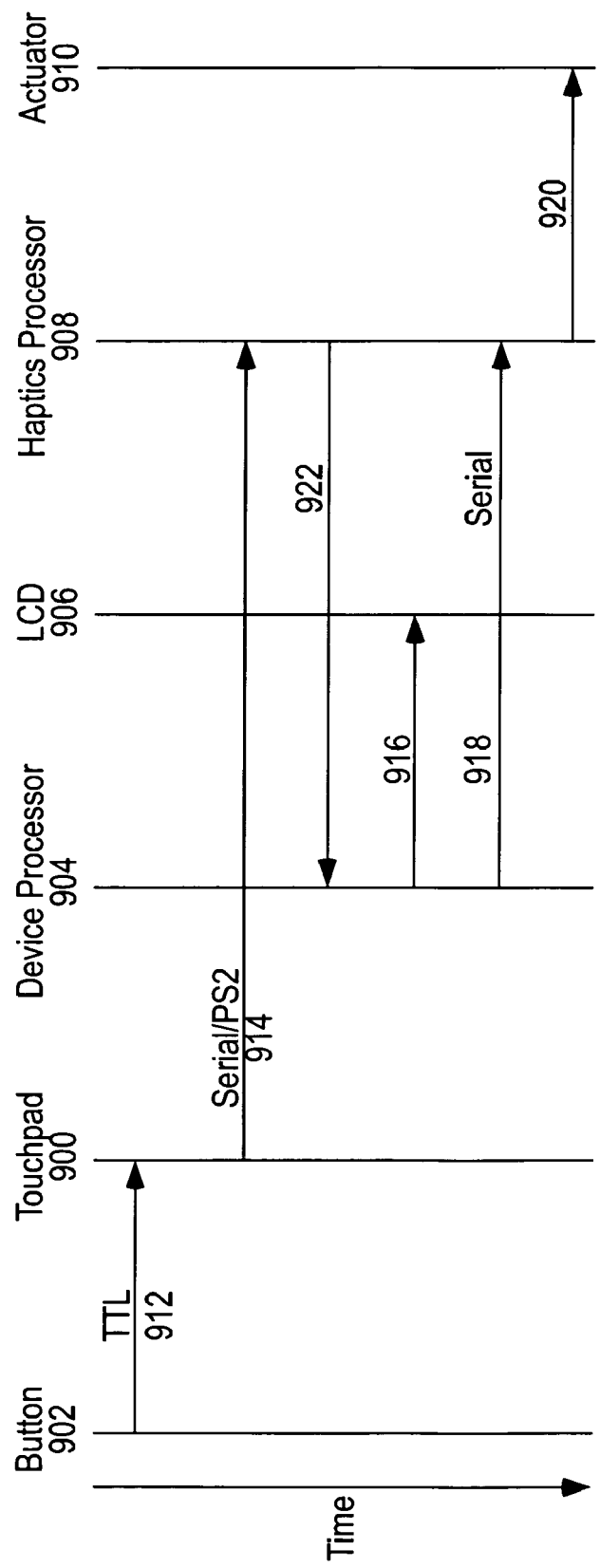

FIGS. 9C and 9D are timing diagrams, illustrating two methods of passing signals between the elements shown in FIG. 9A in an embodiment of the present invention. In the embodiment shown in FIG. 9C, the haptics processing is performed by the haptics processor based on input from the device processor, which includes list information and cursor events. Such an embodiment requires few changes to a device; the device must simply support a serial output interface. Such an interface supports fixed-size detents, end-of-list functionality and hot-key functionality.

Referring to FIG. 9C, when a button 902, such as the buttons shown in the personal MP3 player interface of FIG. 1B, receives input, such as when a user pushes the button 902. In response, the button sends a transistor-transistor logic (TTL) signal to the touchpad 102, 912. The touchpad 102 interprets this information as well as any user input directly on the touchpad 102 and sends a serial or PS/2 signal to the device processor 904, 914. In response, the device processor 904 sends the appropriate signals to the LCD 906 to modify the display viewed by the user 916. The device processor 904 also sends a serial packet to the haptics processor 908, 918. The serial packet may include, for example, a start character, a packet identifier, the length of the currently displayed list, the visible length of the list, the list offset, the visible list offset, the haptic cue, and a checksum. In one embodiment, the haptics cue includes identifiers for new list, interface buttons, parent, and low battery.

The embodiment shown in FIG. 9D includes the same basic components; however, the message flow between the various elements is somewhat different. In this embodiment, the haptics processor intercepts the touchpad 102 radial position signal 914 and includes logic to process the list information accordingly. In such an embodiment, a message 922 passes from the haptics processor to the device processor that includes the touchpad signal. As with the previously illustrated embodiment, such an embodiment requires few changes to the subject device. The embodiment can create various effects, including variable-size detents, end-of-list, hot keys, rate control, virtual buttons, long lists, and breakouts. Since the haptics processor 908 must generate the touchpad signal to send to the device processor 904, the haptics processor may need to emulate the touchpad's native protocol.

Various types of effects may be created to effectively provide haptic cues in an embodiment of the present invention. One embodiment features a "tink" effect on detent change; a "tonk" effect on screen scroll; a "thunk" effect on last item in list; a "pang-ping" effect on new list, a falling frequency on low battery or power down; a "tick-tick" indication when cursor lands on a parent; and a "bleep" effect when a button is pressed.

Figure 10:
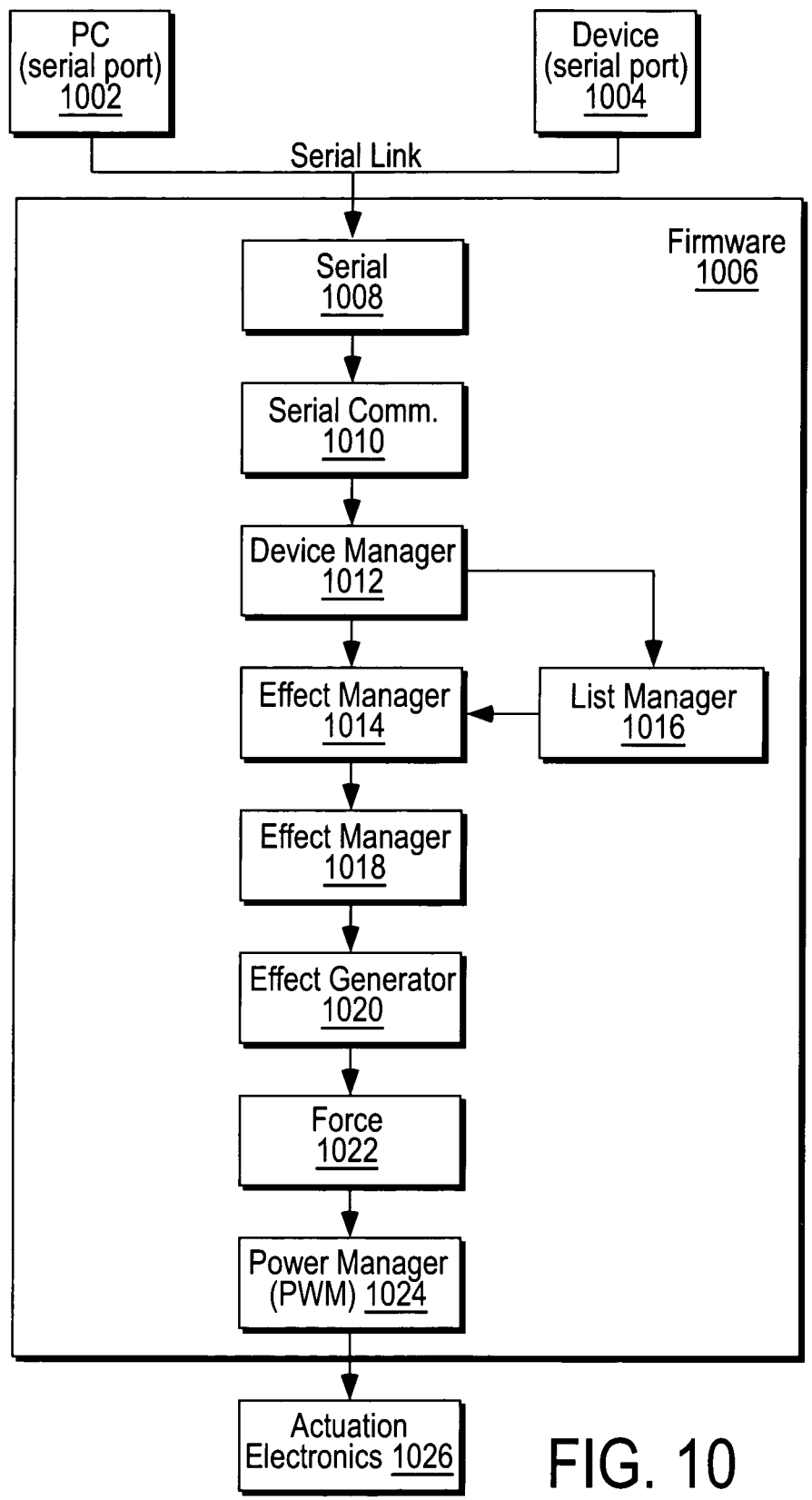
FIG. 10 is a flowchart, illustrating a flow of information between various modules of the firmware in one embodiment of the present invention.

FIG. 10 is a flowchart, illustrating the flow of information between various modules of the firmware in an embodiment of the present invention. The firmware comprises software that is stored in read only memory in a device, such as in an electrically erasable programmable ROM (EEPROM). The firmware is designed as a series of interrelated modules. By utilizing modules, the ease of maintenance and portability of the firmware are enhanced. In the embodiment shown, a PC 1002 or Device 1004 serial port utilizes a serial link to provide information to a serial module 1008. Either device can set force effects in the firmware. The serial module implements the serial communications link using hardware-dependent calls. The main task is to send and receive characters. The serial communication module 1010 implements the serial communication protocol to code-decode packets that will be sent or received. The device manager module 1012 determines which module is responsible for processing an incoming packet. The types of incoming packet may include list effects, basic effect, or a packet containing position only. If the device manager 1012 detects an effect packet, the list manager module 1016 handles the packet. The list manager module 1016 interprets the list parameters and implements the required effect. If the device manager 1012 detects a basic effect, the effect manager 1014 handles the effect. As indicated in FIG. 10, the list manager 1016 may determine that a basic effect is required.

The effect generator module 1020 computes the effect. The force module 1022 performs the interface functionality between the computed force value and the micro-controller peripheral that writes the computed force to the actuator and associated electronics. The force module 1022 supports an enabling line, a direction line and a pulse width modulation (PWM) line. The PWM module 1024 is a hardware-dependent module that writes the computed force values to the actuator and/or electronics. The firmware controls the instantaneous current through the coil by modulating the duty cycle of a high frequency pulse train, typically 10-40 KHz. The module 1024 supports each of the lines specified in the force module 1022 even if a corresponding action is not available. Supporting the additional lines provides flexibility and portability.

Figure 11A:
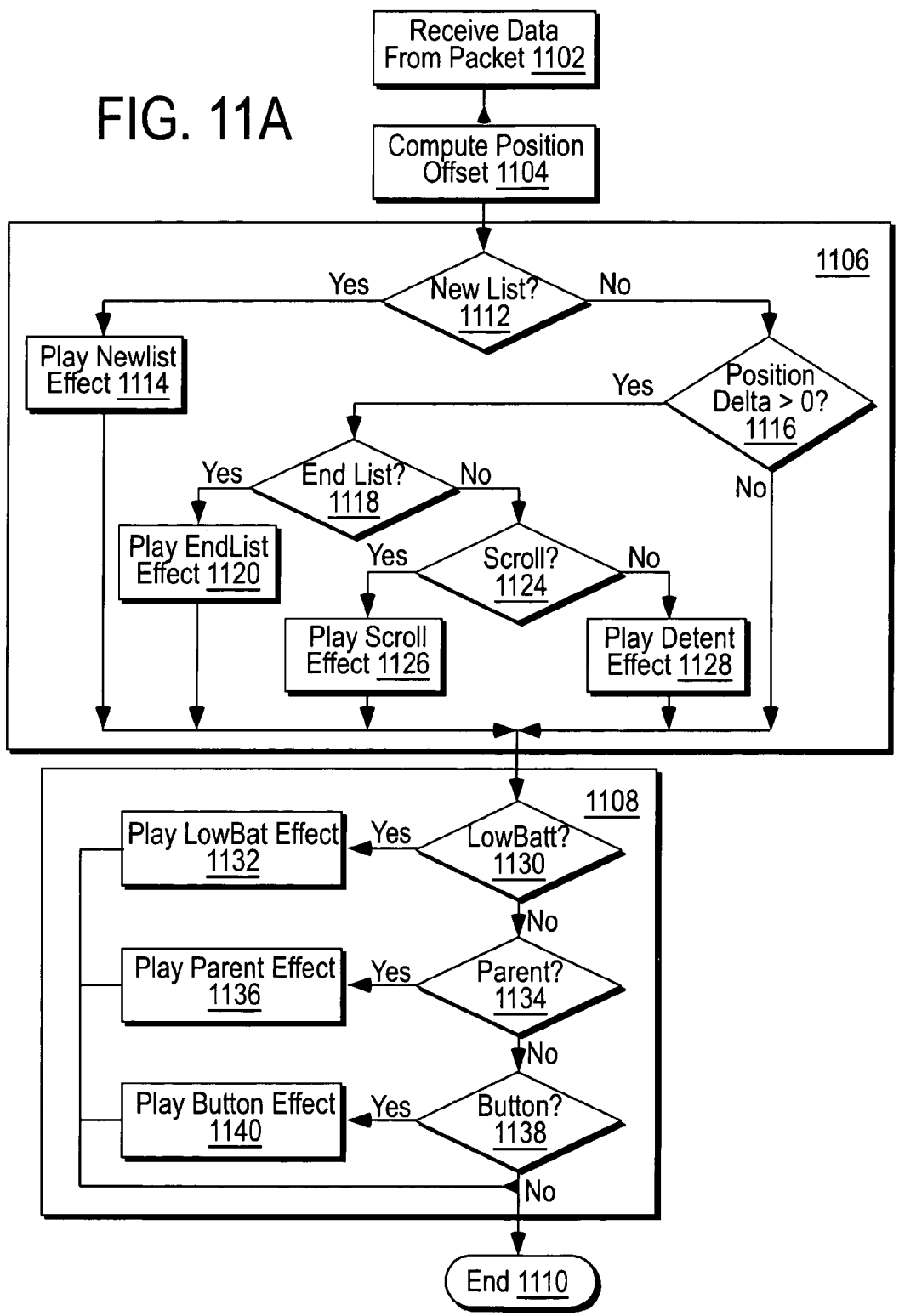
FIGS. 11A and 11B illustrate an embodiment of a process for interpreting list and haptic cue parameters according to the present invention.
Figure 11B:
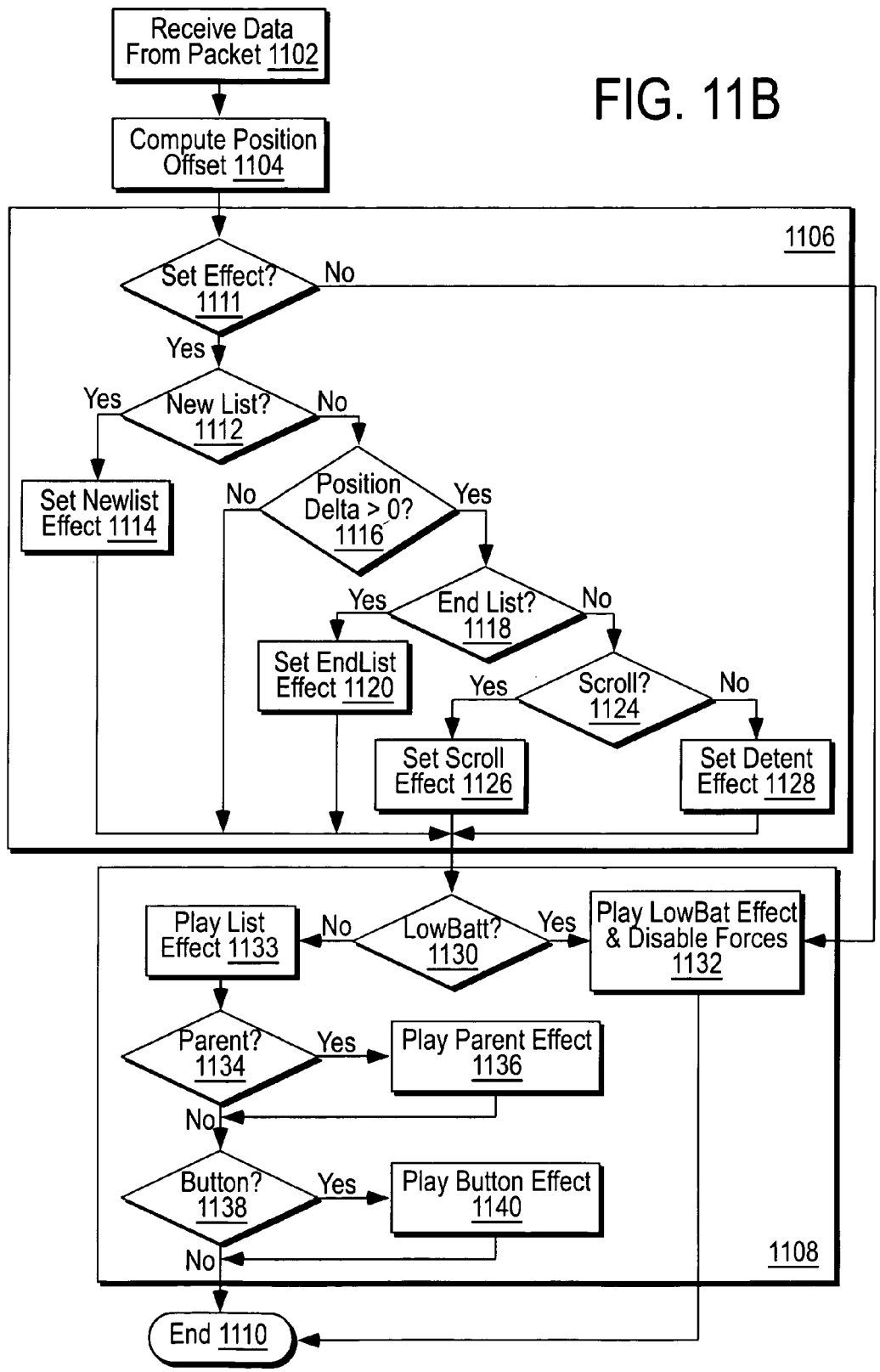

FIGS. 11A and 11B illustrate two embodiments of the process for interpreting list and haptic cue parameters in embodiments of the present invention. The process illustrated in FIG. 11A is a synchronous process; the process illustrated in FIG. 11B is asynchronous. An example helps to illustrate the difference between the two approaches. In the exemplary case, the firmware compares two consecutive packets and determines that (i) the cursor jumped 3 cells and (ii) the battery is low. In a synchronous embodiment, the processor processes the list effects before disabling the forces. In other words, the device expends current to generate forces notwithstanding the low power level of the battery. If, instead, the forces are merely set and then played after it is determined whether the battery level is low, asynchronous embodiment, power output is minimized according to battery state.

In the process illustrated in FIG. 11A, the firmware gets data from a received packet 1102. The firmware utilizes the data to compute a position offset 1104. The firmware utilizes this information for both list processing 1106 and haptic processing 1108 before ending the process 1110.

If the data indicates that the user has entered a new list 1112, firmware causes a new list effect to be played 1114. Playing the effect immediately upon determining the state of the interface is synchronous processing. If the data does not indicate that a new list has been entered, the firmware determines whether the position has changed, i.e., is the position delta greater than zero 1116. If so, the firmware determines whether the end-of-list has been reached 1118. If yes, the firmware causes the end list effect to be played 1120. If the end-of-list has not been reached, the firmware determines whether a scroll event has occurred 1124. If so, the firmware causes a scroll effect to be played 1126, and if not, a detent effect to be played 1128. When the firmware completes the list processing 1106, it begins the haptic processing 1108.

The firmware first checks for a low battery state 1130. If the battery is low, the firmware causes the low battery effect to be played 1132 and ends the process 1110. If not, the firmware determines whether a parent effect should be played 1134. If so, the firmware causes a parent effect to be played 1136 and ends the process 1110. If not, the firmware determines whether a button effect should be played 1138. If so, the firmware causes a button effect to be played 1140 and ends the process 1110. If no button effect is to be played, the firmware ends the process 1110.

The asynchronous process illustrated in FIG. 11B is almost identical except for the addition of a couple of processes. Also, rather than causing effects to be played immediately, in the embodiment shown in FIG. 11A, the firmware sets the event to be played subsequently. The first step in the list manager process 1106 determines whether an effect should be set 1111. If so, list processing occurs as illustrated in FIG. 11A. If the effect is not to be set, the firmware causes a low battery effect and disables forces 1132. The second additional process occurs during the effect process 1108. If an effect is set in the list process 106, the firmware causes the effect to be played in step 1133, after determining the battery state in step 1130.

To effectively perform the processing logic illustrated in FIGS. 11A and 11B, position latency should preferably be limited to 15 ms, which corresponds to a screen refresh rate of 60 Hz. Packet and list parameter latency, i.e., how often list parameters are changed, are also preferably 15 ms. This period of latency corresponds to how often changes requested by the user can be reflected on the display. The firmware may execute the processing logic in response to a number of events, including effect completion, a timer, and preferably upon packet reception. Various embodiments may perform additional processing, including comparing two consecutive packets to detect changes, allowing multiple effects at one time, and receiving a persistent low battery signal.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A system comprising:
  a bushing;
  a button carrier disposed around the bushing, the button carrier defining a slot;
  a touch-sensitive input device coupled to the bushing and the button carrier, the bushing configured to support and isolate the touch-sensitive input device and to allow the touch-sensitive input device to move in a rotary degree of freedom;
  an actuator configured to induce rotation of the touch-sensitive input device; and a pin coupled to the touch-sensitive input device, the pin configured to engage with the slot such that rotation of the touch-sensitive input device is limited by movement of the pin within the slot.

2. The system of claim 1, wherein the touch-sensitive input device comprises a touchpad.

3. The system of claim 2, wherein the touchpad comprises a generally circular touchpad.

4. The system of claim 1, wherein the touch-sensitive input device further comprises a magnet, and wherein the actuator comprises a magnetic core.

5. The system of claim 4, wherein the magnetic core comprises an E-core.

6. The system of claim 1, wherein the actuator comprises:
a motor; and
a drive belt driven by said motor and configured to produce the rotational force on the touch-sensitive input device.

7. The system of claim 6, wherein the motor further comprises a pair of end stops to limit the rotation of the motor.

8. The system of claim 1, wherein the actuator comprises:
a motor; and
an eccentric rotating mass configured to impart a vibration on the touch-sensitive input device.

9. The system of claim 1, wherein the actuator comprises:
a motor; and
a flexure driven by said motor and configured to produce the rotational force on the touch-sensitive input device.

10. The system of claim 9, wherein the flexure comprises brass.

11. The system of claim 1, further comprising a housing, wherein the actuator is grounded to the housing.

12. The system of claim 1, further comprising a processor configured to receive an output signal from the touch-sensitive input device and generate an input signal operable to cause the actuator to produce the rotational force.

13. The system of claim 1, wherein the actuator is configured to self center based on a reluctance torque.

14. The system of claim 1, wherein the touch-sensitive input device defines a hole in its center and wherein the bushing is inserted into the hole from the underside of the touch-sensitive input device.

15. The system of claim 1, wherein the slot has a length of approximately 2 millimeters.

16. The system of claim 1, wherein the button carrier comprises a button.

* * * * *

UNITED STATES PATENT AND TRADEMARK OFFICE
CERTIFICATE OF CORRECTION

PATENT NO.       : 8,125,453 B2
APPLICATION NO.  : 10/689130
DATED            : February 28, 2012
INVENTOR(S)      : Erik J. Shahoian et al.

It is certified that error appears in the above-identified patent and that said Letters Patent is hereby corrected as shown below:

Page 2, Column 2, Line 2, Please delete "Kamper", please insert -- Cooper --.

Signed and Sealed this
Twenty-second Day of May, 2012

David J. Kappos
*Director of the United States Patent and Trademark Office*